Sept. 29, 1970

O. LA FLECHE 3,531,154

ENERGY ABSORBING SEAT MOUNTING DEVICE

Filed April 21, 1969

INVENTOR
OAKLEY A. LAFLECHE

BY Hauke, Krass, & Gifford
ATTORNEYS

INVENTOR
OAKLEY A. LAFLECHE
BY *Hauke, Kraus, & Gifford*
ATTORNEYS

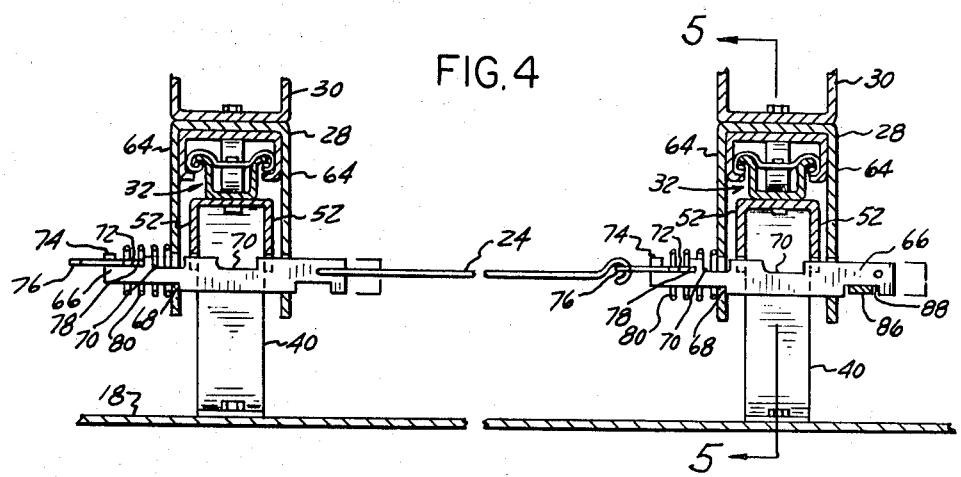
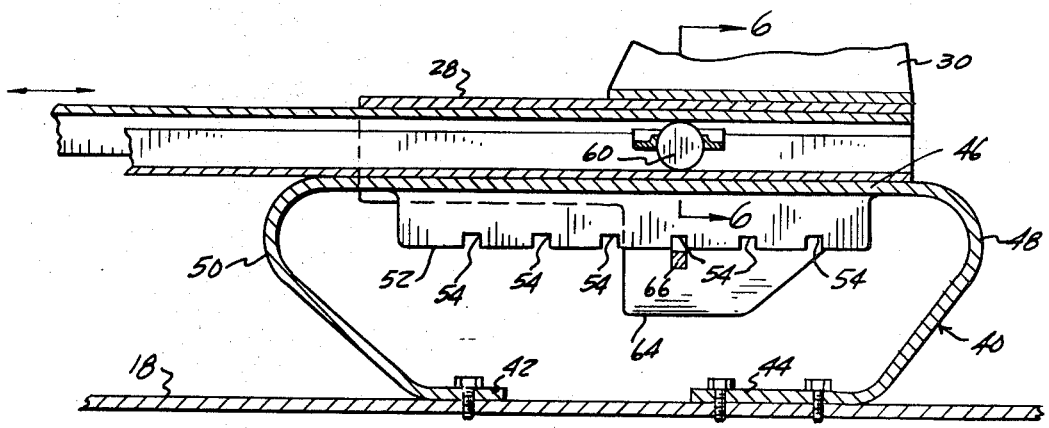
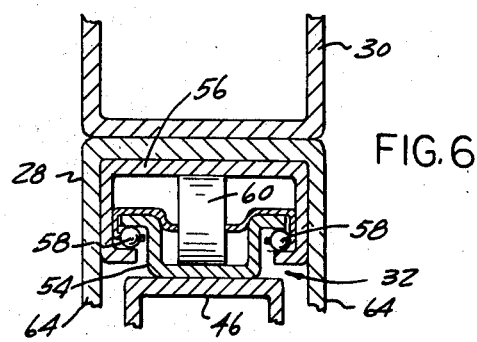
INVENTOR
OAKLEY A. LAFLECHE
BY Hauke, Kraas, & Gifford
ATTORNEYS

United States Patent Office 3,531,154
Patented Sept. 29, 1970

3,531,154
ENERGY ABSORBING SEAT MOUNTING DEVICE
Oakley La Fleche, Eureka Springs, Ark., assignor to Howell Industries, Incorporated, Detroit, Mich., a corporation of Michigan
Continuation-in-part of application Ser. No. 620,339, Mar. 3, 1967. This application Apr. 21, 1969, Ser. No. 826,757
Int. Cl. B60n 1/08
U.S. Cl. 296—65      15 Claims

ABSTRACT OF THE DISCLOSURE

A vehicle seat mounting device having upper and lower support members interconnected to provide a longitudinally adjustable support between a seat unit and the floor of the vehicle. A seat belt is anchored to the upper support member to restrain relative movement of an occupant of the seat unit with respect to the interior of the vehicle during a sudden deceleration of the vehicle.

The lower support member has elastically deformable members arranged to gradually reduce the momentum created by the weight of the occupant during a sudden acceleration or deceleration so that the occupant experiences a cushioned rather than a sudden stop.

REFERENCE TO RELATED APPLICATIONS

This is a continuation-in-part of my co-pending Application Ser. No. 620,339, filed Mar. 3, 1967, now abandoned, for "Energy Absorbing Seat Mounting Device," assigned to applicant's assignee.

BACKGROUND OF THE INVENTION

Field of the invention

This invention relates to seat mounting devices, and more particularly to a seat mounting device for a vehicle having elastically deformable members for absorbing the momentum of the occupant of the seat produced by a sudden acceleration or deceleration of the vehicle.

Description of the prior art

Recent congressional and public interest in reducing fatalities and injuries produced by motor vehicles involved in collisions either between themselves or other large objects has manifested itself in the form of regulations requiring devices in the vehicle for reducing those injuries caused by a sudden deceleration of the vehicle. Thus, for example, studies have indicated that a significant injury producing factor is the sudden relative displacement between the occupant of the vehicle and various injury producing objects arranged in the interior of the vehicle caused by the vehicle coming to a rapid stop.

The general approach to the aforementioned problem had been to provide restraining devices generally taking the form of a seat belt arrangement for encircling the torso of the occupant, the terminal ends of the seat belts being anchored to a stationary structure of the vehicle. Theoretically, by restraining the occupant from displacement from his seat during a sudden deceleration of the vehicle, the occupant will not move into contact with the windshield or other hard surfaces of the vehicle.

However, two derivative problems have arisen with respect to conventional seat mounting devices. The first major problem is that the weight of the occupant in combination with the seat produces high intertial forces. These inertial forces act on the seat mounting device and tend to separate those components attached to the seat assembly from those components anchored to the floor. A co-pending application, Ser. No. 614,863, filed Feb. 3, 1967, for an "Adjustable Seat Mounting" and assigned to the assignee of the present application, discloses an improved adjustable seat mounting device having components interconnected to one another in a novel arrangement to rigidly resist the separation forces.

The second major problem of conventional seat mounting devices employing a seat belt restraining assembly manifests itself in the shock of the restraining forces suddenly imposed on the occupant of the seat. Thus, if the vehicle comes to a sudden stop from a rapid rate of travel, the seat belt which is anchored to a non-yielding portion of the vehicle also comes to a sudden stop. Simultaneous with the stop, the weight of the occupant creates a large momentum acting in the previous direction of travel. The kinetic energy of this momentum is absorbed by the torso of the occupant thereby producing serious internal injuries.

The present invention obviates this last mentioned problem by providing an energy absorbing seat mounting device arranged so that the occupant of the seat experiences a cushioned rather than a sudden stop.

SUMMARY OF THE INVENTION

An analysis of the typical seat mounting device employing a seat belt for encircling the occupant of the seat and having its lower ends anchored to a portion of the seat mounting device indicates that when the vehicle is moving forward and then is suddenly stopped, the weight of the occupant creates a momentum acting in a direction generally toward the front of the vehicle. The seat belt will tend to act in response to this momentum and swing about its anchor points so that a substantial component of the momentum is directed downwardly toward the floor. The broad purpose of the present invention is to provide a seat mounting assembly which will generally elastically yield in response to this downwardly directed momentum in such a manner that the occupant experiences a cushioned stop.

The preferred embodiment of the present invention, which will substantially be described in greater detail, employs a pair of seat mounting devices spaced transversely of the vehicle. Each seat mounting device includes an upper support member adapted to the seat assembly and a lower support member attached to the floor of the vehicle. An elongated slide unit interconnects the upper support member to the lower support member so that the seat assembly is movable in forward and rearward directions with respect to the floor of the vehicle. A latch bar interconnects each of the upper support members to the lower support members so that the seat can be rigidly locked in a selected position usually chosen to accommodate the physical characteristics of the occupant. The latch bars are preferably interconnected by a cable so that the two seat mounting devices operate in combination in response to a single release effort.

The lower support member of each seat mounting device preferably includes a rearward, resilient but normally non-yielding, narrow strap member of spring steel having an intermediate portion supported above the floor of the vehicle to support the slide unit. The opposite ends of the strap are bent downwardly from the intermediate portion towards the floor of the vehicle to provide depending generally U-shaped leg portions and are attached to the floor. A second resilient but normally non-yielding strap member has an upper portion supporting the forward end of the slide unit, a generally U-shaped leg portion and a lower end attached to the floor of the vehicle. Under normal load conditions, the lower support member provides a substantially rigid weight bearing support between the weight of the occupant and the seat assembly, and the floor. However, a substantial force acting on the seat mounting device causes the U-shaped leg portions of the lower support members to gradually yield in the direction of the force and thereafter recover to substantially assume their original shape.

This elastically deformable, supporting arrangement provides an additional advantage in cushioning the occupant from the type of injury generally referred to as a "whiplash." This injury is usually produced by a sudden increase in the forward movement of the vehicle. The increase in vehicle movement produces violent forces acting between supported and unsupported portions of the occupant's anatomy. The U-shaped leg portions of the lower support members reduce the impact of this type of occurrence on the occupant by gradually yielding in the direction of the forces so that the occupant and the seat move as a unit. Since these forces tend to raise the occupant and the seat unit away from the vehicle floor, the U-shaped leg portions gradually extend in the direction of the forces and then resume their original shape.

Preferably, the U-shaped leg portions of both forward and rear strap member have sections extending in parallel direction, such as to provide upon yielding a parallelogram of forces for controlled yielding movement in response to the magnitude of the inertia force. Thus, the normally uncontrolled flexibility of known resilient seat suspensions has been effectively avoided.

The seat belt is advantageously mounted to the movable upper support member instead of to a stationary part of the vehicle, as is the conventional practice, so as not to counteract the gradual yielding of the strap support members. By this arrangement, the inertia force of the body against the seat belt is considerably reduced to lessen the possibility of internal injuries which may otherwise be caused by the restraining force of the seat belt.

It is therefore an object of the present invention to provide a seat belt mounting device for supporting a seat assembly above the floor of a vehicle which responds to a substantial force imposed on the seat mounting device tending to produce a relative displacement between the seat and the floor of the vehicle by gradually deforming in the direction of the force so that the occupant of the seat assembly experiences a cushioned acceleration or deceleration.

It is another object of the present invention to provide an energy absorbing restraining system for the occupant of a vehicle including a seat mounting device adapted to normally provide a substantially rigid support between the floor of the vehicle and the seat assembly, a seat belt having its lower terminal ends fixed to a rearward portion of the seat mounting device and a middle section encircling the torso of the occupant of the seat, the seat mounting device having supporting portions arranged to elastically deform in a direction corresponding to a component of the momentum of the occupant of the seat produced by a sudden deceleration or acceleration of the vehicle.

It is still a further object of the present invention to provide a seat mounting device for supporting a seat assembly above the floor of the vehicle with supporting portions of generally U-shaped form in a direction of weight transfer between the seat and the floor and adapted to gradually yield in response to a predetermined force and then assume their original shape.

Still further objects and advantages of the present invention will readily occur to one skilled in the art to which the invention pertains upon reference to the following detailed description.

DESCRIPTION OF THE DRAWINGS

The description refers to the accompanying drawings in which like reference characters refer to like parts throughout the several views and in which:

FIG. 4 is a transverse sectional view taken along line 4—4 of FIG. 2;

FIG. 5 is an enlarged view taken along line 5—5 of FIG. 4; and

FIG. 6 is a view taken along line 6—6 of FIG. 5.

DESCRIPTION OF THE PREFERRED EMBODIMENT

Figure 1:
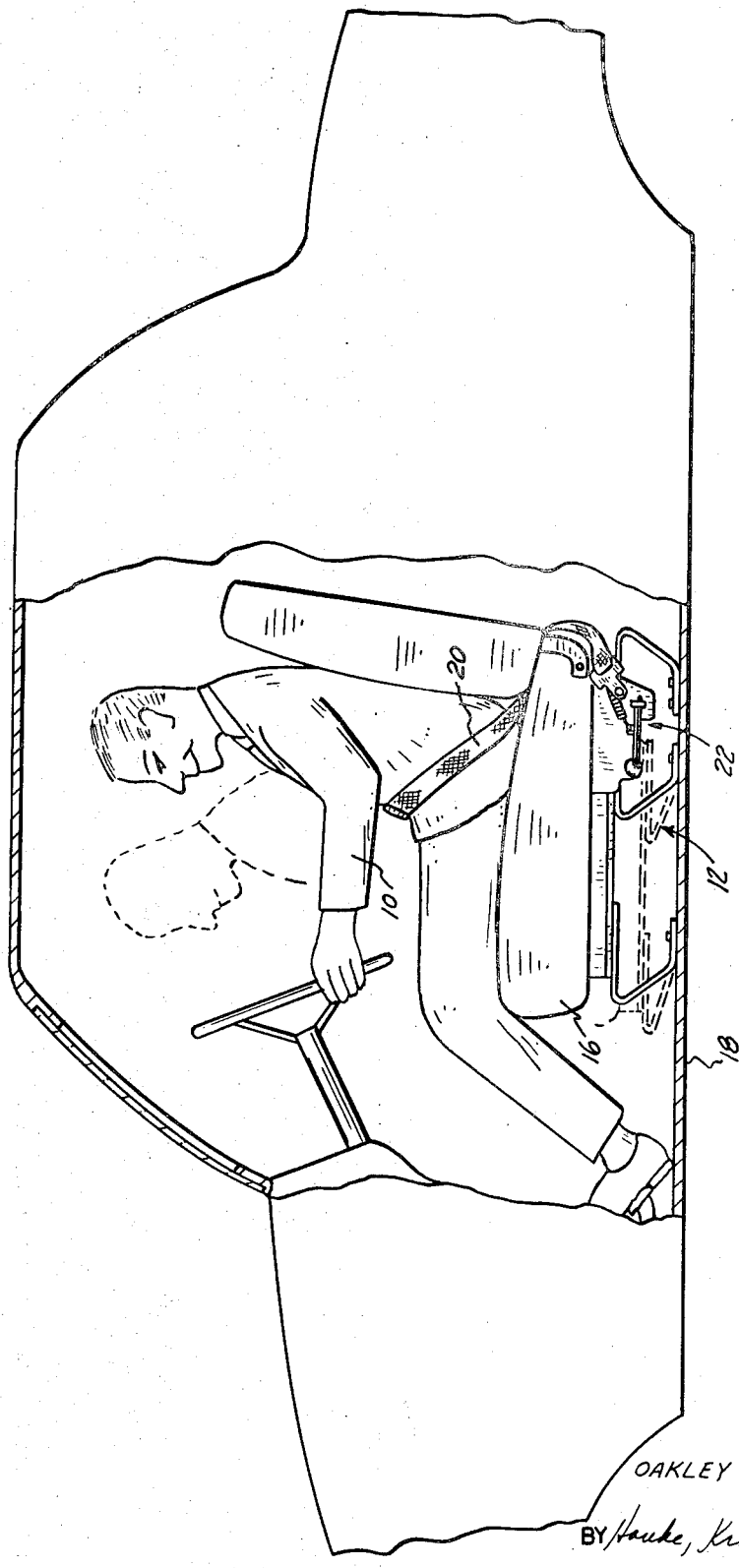
FIG. 1 is a view of a vehicle seat mounting arrangement illustrating a preferred embodiment of the invention.
Figure 2:
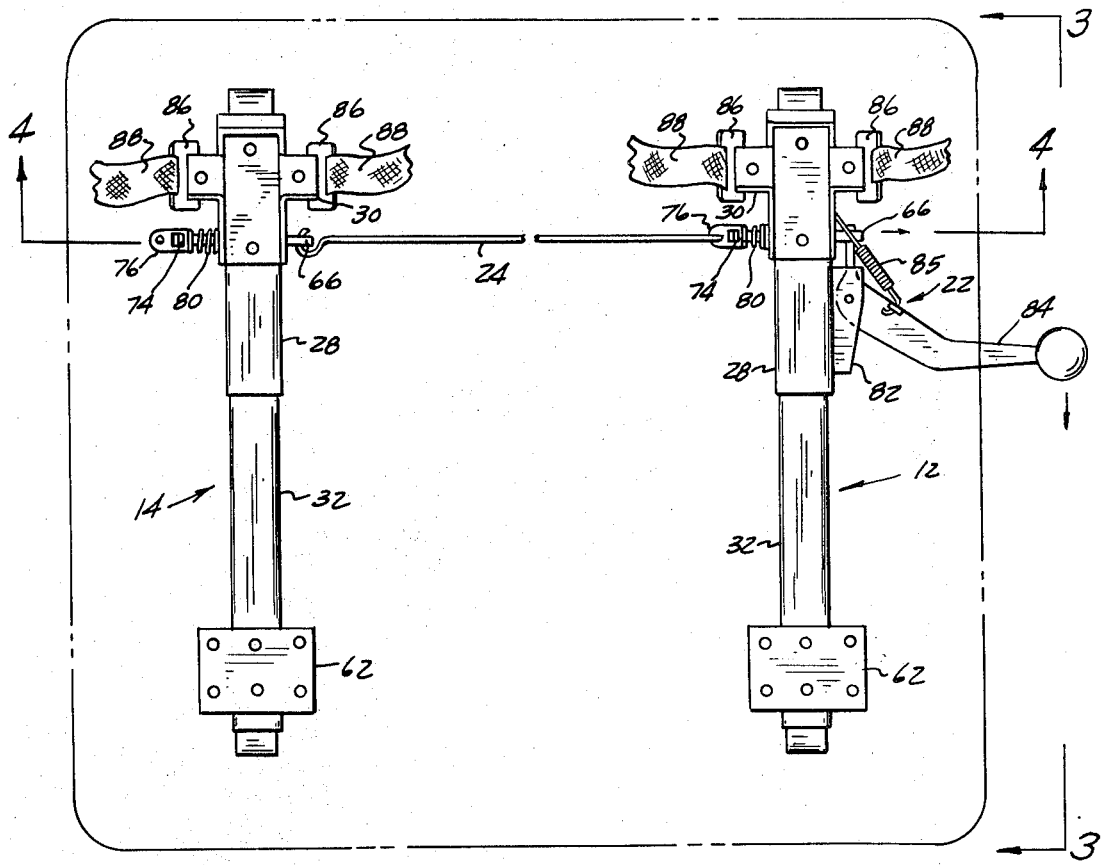
FIG. 2 is a plan view illustrating the arrangement of the seat mounting device supporting the seat assembly of FIG. 1.

Now referring to the drawings, FIGS. 1 and 2 illustrate a preferred safety seating arrangement for an occupant 10 of a vehicle comprising a pair of seat mounting devices 12 and 14 transversely spaced from one another with respect to the longitudinal axis of the vehicle and arranged to support a seat assembly 16 above the floor 18 of the vehicle. A seat belt 20 encircles the torso of the occupant 10 and is intended to prevent a sudden displacement of the occupant 10 with respect to the seat upon the occurrence of forces sharply opposing the movement of the vehicle.

Seat mounting devices 12 and 14 are similar except that seat mounting device 12 is provided with a handle arrangement 22. A cable member 24 interconnects the seat mounting devices 12 and 14 so that a release effort applied to the handle assembly 22 is transmitted to the companion seat mounting device 14.

For purposes of description, seat mounting device 12 will be described in detail, it being understood that seat mounting device 14 has a similar construction. As can best be seen in FIG. 3, the seat mounting device 12 includes a lower support assembly 26 fixed to the floor 18 of the vehicle. An upper support member 28 carries a bracket 30 which provides a means for attaching the upper support member 28 to the seat assembly 14.

An elongated slide unit 32 interconnects the upper support member 28 to the lower support assembly 26 and provides means for permitting the upper support member 28 to move forwardly and rearwardly with respect to the lower support assembly 26.

The lower support assembly 26 includes a forward support member 34 comprising an elongated substantially U-shaped strip of spring steel with a lower portion 36 fixed to the floor 18 by any suitable means and an upper portion 38 spaced above the lower portion 36. The upper portion 38 supports the forward end of the slide unit 32. It is to be understood that the forward support member 34 normally provides a substantially rigid support for transmitting normal weight forces between the slide unit 32 and the floor 10.

The lower support assembly 26 also includes a rear support member 40 comprising an elongated strip of spring steel bent into a generally C-shaped configuration including a pair of opposed end portions 42 and 44 attached to the floor 18, an intermediate portion 46 spaced above the end portions 42 and 44 and U-shaped leg portions 48 and 50 connecting the end portions 44 and 42 to the intermediate portion 46. The intermediate portion 46 has a linear shape preferably forming an extension of the upper portion 38 of the forward support member 34 to support the rear portion of the slide unit 32. The U-shaped leg portions 48 and 50, like the U-shaped portion of the forward support member 34, normally provide a rigid support for transmitting normal weight forces from the seat assembly 16 to the floor 18.

As can best be seen in FIG. 5, a pair of flange portions 52 depend downwardly from the intermediate portion 46 and extend in a length corresponding to the relative movement between the upper support member 28 and the lower support assembly 26. A series of notches 54 are formed in the lower edge of the flanges 52. Each of the notches 54 corresponds to a selected relative longitudinal position between the upper support member 28 and the lower support member 26.

Now referring to FIG. 6, slide unit 32 comprises a lower, elongated, channel-shaped slide member 54 fixed to the portions 46 of the rearward support member 40 and the upper leg 38 of the forward support member 34. An upper slide member 56 has downwardly depending sidewalls adapted to interengage the sidewalls of the lower slide member 54 through a series of ball bearing elements 58. The ball bearing elements 58 transmit lateral forces from the upper slide member 56 to the lower slide member 54, while a series of longitudinally spaced roller bearings 60 transmit vertical forces from the upper slide members 56 to the lower slide member 54. The upper slide member 56 is rigidly attached to the upper support member 28 by rivets or the like (not shown).

The upper slide member 56 has a pad member 62 (FIG. 3) at its forward end for directly attaching the seat assembly 16 to the upper slide assembly. Thus, it can be seen that the seat assembly 16 is movable in fore and aft direction with respect to the floor 18.

In order to lock the seat assembly 16 in a selected longitudinal position, the upper support member 28 has a pair of downwardly depending flange sections 64. As can best be seen in FIG. 6, the flange sections 64 closely straddle the slide unit 56. The lower edges of the flanges 64 extend below the flanges 52 of the lower rear support member 40.

As can best be seen in FIG. 4, the flanges 64 are each apertured to support a latch bar 66 for slidable movement along an axis normal to the axis of relative movement of the upper and lower support members. The latch bar 66 is biased into locking position defined by a shoulder 68 coming into abutment with the flange 64.

In the locking position, each latch bar 66 registers in a pair of notches 54 defined in the flanges 52. In this position, therefore, the seat assembly 16 is locked against longitudinal movement.

Each latch bar 66 has a pair of notches 70 along their upper longitudinal edge. The latch bars 66 are movable toward the right, as viewed in FIG. 4, toward a release position wherein the notches 70 register with the lower edges of the flanges 52. In the release position, the upper support member 28 is free for longitudinal movement with respect to the lower support assembly 26.

Each of the latch bars has a second notch 72 defining a laterally directed finger portion 74. A flat retainer element 76 is apertured for engagement with the finger portion 74 and has a body portion 78 disposed in the notch 72. A coil spring 80 is wrapped around the latch and acts between the flange 64 and the retainer 76 so that the latch bars 66 are normally retained in their locking position. It can be seen that the retainer element 76 and the coil spring 80 provide a simple, reliable, and releasable means for connecting each latch bar 66 to its respective upper support member 28. Thus, the latch bar 66 can be quickly disassembled from its associated upper support member 28 by compressing the coil spring 80 toward the flange 64 and removing the retainer 76 from the finger portion 74.

Referring back to FIG. 2, the upper support member 28 of the seat assembly 12 has a lateral flange 82 for pivotally supporting a handle 84. The handle 84 is biased toward a position corresponding to the locking position of latch bars 66 by a spring 85. The handle 84 includes a finger section 86 engaged with a notch 88 in the latch bar 66 of seat assembly 12. By pivoting the handle 84 in a clockwise direction as viewed in FIG. 2, the finger 86 produces a force on the latch bar 66 of the seat mounting assembly 12 effective to move the latch toward the release position. This release force is transmitted through the cable 24 to the latch bar 66 of the opposite seat mounting assembly 14 so that the two latch bars 66 move together in response to the application of a single release effort applied to handle 84.

Figure 3:
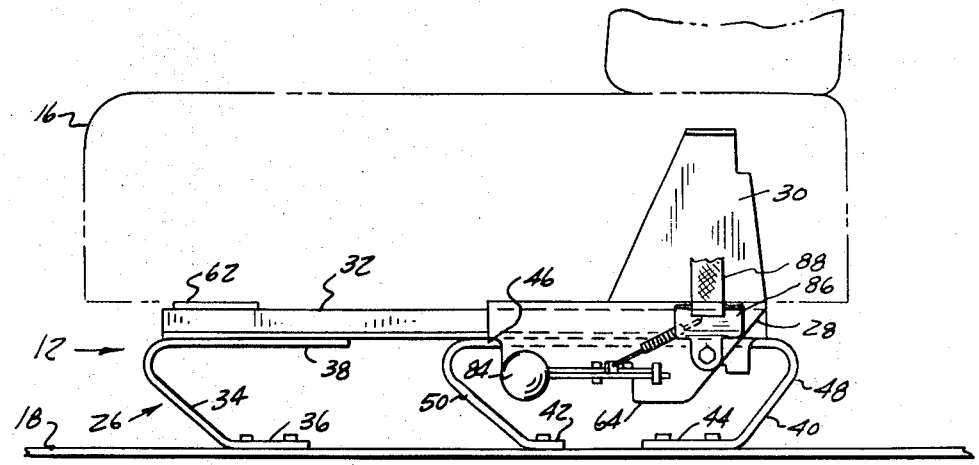
FIG. 3 is a side elevational view of one of the seat mounting devices taken along line 3—3 of FIG. 2.

As can best be seen in FIGS. 2 and 3, a seat belt fitting 86 is attached to each of the flanges 64 of the upper support member and provides means for anchoring the lower ends 88 of the seat belt 20.

By attaching the anchored ends of the seat belts 20 to the movable upper support members 28, rather than the lower support member or to the floor of the vehicle as is conventional practice, the occupant can strap himself in the seat assembly 16 and then adjust his seat forwardly or rearwardly without readjusting the seat belt 20. Furthermore, this arrangement provides a safety feature in that in the event of a sudden deceleration or acceleration of the vehicle which produces forces tending to separate the upper support member 28 with respect to the lower support assembly 26, the seat belt 20 and the occupant 10 move as a unit with the upper support member 28, whereas, if the seat belt is anchored, for example, to the floor of the vehicle the occupant is exposed to internal injuries as the momentum created by his weight acts against the anchored seat belt.

It can be seen that an improved seat mounting arrangement has been described including a safety seat belt system having its terminal ends anchored generally rearwardly and below the occupant 10 seated in the seat assembly 16. A force suddenly opposing the forward movement of the vehicle will cause the weight of the occupant 10 to create a momentum acting against the seat belt 20 and generally downwardly toward the floor 18.

The forward and rear support members 34 and 40 of the lower support assembly 26 respond to this momentum by yielding toward the floor and absorbing the kinetic energy of the momentum. The lower support assembly 26, after absorbing this energy, is then restored to its original shape.

The forward and rear support members 34 and 40 are constructed such to also respond to forces acting on the seat in a direction other than toward the floor by gradually extending in the direction of these forces and then resuming their original shape as the energy of the force is dissipated. Thus, the preferred seat mounting arrangement cushions the shock produced on the occupant of the seat by rear end collisions or side impacts.

It will be noted, particularly, from FIGS. 1 and 3, that the U-shaped portion of the forward support member 34 and the U-shaped leg portion 50 of the rear support member 40 have sections parallel with each other so that upon gradual yielding of the lower support assembly 26, as seen in FIG. 1, these sections collapse in the form of a parallelogram, thereby providing a controlled yielding and recovery in distinction to conventional uncontrolled resilient seat suspensions, which are not adaptable to be utilized with the particular seat belt mounting herein disclosed.

It is to be understood that the invention has been described in its most simple terms and that various revisions and changes can be made in the preferred embodiment thereof without departing from the spirit of the invention as expressed in the scope of the appended claims.

I claim:
1. In a vehicle having a floor, the combination comprising:
an elongated first member,
a second member connected to the first member for relative motion in directions parallel to the longitudinal axis of the first member,
a latch carried by one of said members and supported for motion between a locking position in which it is engaged with the other of said members to lock said members against said relative motion and a release position in which it is inoperable to prevent said relative motion,
forward and rear support structures connected to the floor of said vehicle and to one of said members so as to support said members in spaced relationship with respect to the floor, said forward and rear support structures forming substantially a parallelogram of forces to be controllably yieldable between said members and the floor to allow said members to be moved in controlled directions toward and away from said floor in respnse to an impact force acting on said members, and a seat structure fastened to one of said members in spaced relationship with respect to the floor such that the weight of the seat structure is normally substantially rigidly supported by said forward and rear support structure.

2. The combination as defined in claim 1, and in which the second member is channel shaped in cross section having a mid-section and a pair of spaced, parallel sides depending from its mid-section, the second member being mounted on the first member such that the parallel sides straddle the first member, and said latch is mounted on the sides of the second member such that said second member and said latch encircle said first member, and said latch is movable with respect to said second member between its locking and release position only in a plane that is perpendicular to the longitudinal axis of said first member to thereby prevent separation of said first member with respect to said second member in directions transverse to said longitudinal axis.

3. The combination defined in claim 1, and in which said support structure includes at least one pair of substantially U-shaped legs, one associated with each end of said first member, each of said legs having a lower end connected to said floor, an upper end connected to said first member so that said first member is supported above said floor, and gradually yieldable parallel portions connecting the ends of said legs to allow their upper ends to be moved in unison with respect to their lower ends in response to the application of said force on said members.

4. The combination as defined in claim 1, including means for attaching a seat belt to the member to which said seat structure is fastened.

5. The combination defined in claim 1, in which the latch is engageable with the other of said members proximate one end of the elongated first member, and including means for attaching a seat belt to the member to which said seat structure is fastened adjacent the same end of said elongated first member with which said latch is engageable.

6. In a vehicle having a floor, the combination comprising a seat structure, a plurality of U-shaped legs disposed at the forward and rearward end of said seat structure, each having one end connected to the seat structure and its other end connected to the floor so that said legs cooperate to support at least a portion of said seat structure in a normal position, spaced with respect to the floor, and each of said legs having a yieldable portion between its ends disposed substantially parallel to each other and formed to gradually flex in response to the application of an impact force on the seat structure in a direction longiutdinal of the vehicle to allow said seat structure to be moved by said impact force from its normal position with respect to the floor, and then to unflex to return said seat structure toward its normal position upon removal of said impact force.

7. The combination as defined in claim 6, including means mounted adjacent the ends of said legs connected to said seat structure for attaching a seat belt.

8. An adjustable seat mounting structure suitable for mounting a seat structure on the floor of a vehicle comprising an elongated first member, a second member connected to the first member for motion in directions parallel to the longitudinal axis of the first member, first means on one of said members for fastening a seat structure, second means on the other of said members for mounting said members to the floor of a vehicle, and resilient leg structure connecting said second means with said floor in load supporting position, said resilient leg structure being formed as substantially a parallelogram to be controllably yieldable in unison in response to the application of an impact force tending to move the first means with respect to said floor in a direction corresponding to the direction of said impact force and to be restored toward its normal load supporting position upon the removal of said impact force.

9. The combination as defined in claim 8, in which said resilient leg structure includes at least a pair of legs having one end connected to one of said members and the other end of each leg being spaced in a common plane parallel to the longitudinal axis of said one member for connection to said floor.

10. An energy absorbing vehicle seat suspension system comprising a seat mounting device comprising a first support member having a base for attachment to the floor of a vehicle, and a raised portion spaced with respect to the base and connected to the base by a load bearing gradually yieldable means formed to transmit a force from said raised portion to said base, a second support member mounted on said first support member so as to be movable relative to said first support member between selective positions, latch means for locking said first and second support members in selective positions, means for anchoring a seat belt to said seat mounting device, means for attaching a seat to said second support member, means including said gradually yieldable means for attaching said first support member to a vehicle floor so that the energy of an impact force acting on said seat attached to said second support member and tending to displace said seat will be partially absorbed by the gradually yieldable means of said first support member, said gradually yieldable means comprising a plurality of resilient legs disposed at the forward and rearward end of said first support having intermediate support portions disposed substantially parallel to each other so as to form substantially a parallelogram adapted for unitary movement in a substantially linear direction under load application.

11. The invention as defined in claim 10, including a slide unit having a first portion fixed to said raised portion of said first member and a second portion fixed to said second support member, said first and second portions of said slide unit being interconnected for relative longitudinal sliding movement.

12. The invention as defined in claim 11, wherein said second support member has a pair of downwardly depending flange sections arranged in spaced parallel relationship and straddling a portion of said slide unit, and said latch means includes a latch member slidably carried by said flange sections, said latch member and said first support member having interengaging abutments to lock said first and second members in said selective relative positions.

13. The invention as defined in claim 12, wherein said first support member is provided with a series of abutments extending in a direction corresponding to the relative movement between said first and second members to form a rack, said latch has notches and abutments and is movable along an axis between a locking position wherein said abutments engage the abutments of said rack to lock the first and second support members against relative motion, and a release position wherein the notches of said latch register with the abutments of said rack to allow relative motion between the first and second support members.

14. The invention as defined in claim 13, including a second seat mounting device spaced from said first mentioned seat mounting device, said first and second seat mounting devices being adapted to cooperate with one another to support said seat unit above the floor of a vehicle.

15. The invention as defined in claim 14, wherein the means for anchoring the terminal ends of said seat belt unit are fixed to said downwardly depending flange sections.

References Cited
UNITED STATES PATENTS

| | | |
|---|---|---|
| 2,227,717 | 1/1941 | Jones. |
| 2,546,268 | 3/1951 | Legris _____ 248—429 X |
| 3,204,916 | 9/1965 | Pickles _____ 248—429 |
| 3,207,554 | 9/1965 | Dall _____ 248—429 X |

LEO FRIAGLIA, Primary Examiner

J. A. PARKER, Assistant Examiner

UNITED STATES PATENT OFFICE
CERTIFICATE OF CORRECTION

Patent No. 3,531,154     Dated 29 Sept. 1970

Inventor(s) OAKLEY A. LaFLECHE

It is certified that error appears in the above-identified patent and that said Letters Patent are hereby corrected as shown below:

Column 2, line 43, after "adapted" insert

-- for attachment --

Column 7, line 58, change "longiutdinal" to

-- longitudinal --

(SEAL)
Attest:

Edward M. Fletcher, Jr.
Attesting Officer

WILLIAM E. SCHUYLER, JR.
Commissioner of Patents